United States Patent [19]

Abe

[11] Patent Number: 5,094,580
[45] Date of Patent: Mar. 10, 1992

[54] STRUCTURE FOR CONNECTING TWO PLATES

[75] Inventor: Nobuo Abe, Kanagawa, Japan

[73] Assignee: Ikeda Bussan Co, Ltd., Ayase, Japan

[21] Appl. No.: 690,566

[22] Filed: Apr. 24, 1991

[30] Foreign Application Priority Data

Apr. 25, 1990 [JP] Japan .............................. 2-43504[U]

[51] Int. Cl.⁵ ............................................. F16B 21/00
[52] U.S. Cl. ................................... 411/553; 411/177; 411/349; 403/349; 24/297; 24/590
[58] Field of Search ............... 411/107, 349, 549, 553, 411/173, 177, 182, 970, 999; 403/348, 349, 294, 254, 263; 24/297, 293, 590

[56] References Cited

U.S. PATENT DOCUMENTS

| | | | |
|---|---|---|---|
| 3,853,414 | 12/1974 | Hirano et al. | 403/349 |
| 4,133,560 | 1/1979 | Ishikawa et al. | 403/349 |
| 4,653,708 | 3/1987 | Rich | 24/590 |
| 4,762,437 | 8/1988 | Mitomi | 411/549 |
| 4,929,116 | 5/1990 | Mahl | 403/263 |

Primary Examiner—Neill R. Wilson
Attorney, Agent, or Firm—Foley & Lardner

[57] ABSTRACT

Two plates are connected to each other through brackets and fixing pins. The bracket includes a base disc portion, a semi-cylindrical wall portion and a pair of projections. The wall portion is perpendicular to the base disc portion. The projections radially outwardly extend from diametrically opposed portions of the wall portion. One of the two plates has an opening. The opening has concentrically connected smaller and larger circular portions and a pair of notches. The notches are positioned at diametrically opposed portions of the smaller circular portion and have the same thickness as that of the smaller circular portion. The smaller and larger circular portions and the notches are so sized as to receive the semi-cylindrical wall portion, the base disc portion and the projections, respectively. The thickness of the smaller circular portion is the same as the distance between the projection and the base disc portion. The thickness of the larger circular portion is the same as that of the base disc portion.

8 Claims, 2 Drawing Sheets

STRUCTURE FOR CONNECTING TWO PLATES

BACKGROUND OF THE INVENTION

1. Field of the Invention

The present invention relates in general to a structure for connecting two plates, and more particularly to a structure for connecting two plates through brackets and fixing pins.

2. Description of the Prior Art

In order to clarify the task of the present invention, one conventional structure for connecting two plates of the above-mentioned type will be outlined with reference to FIG. 7 of the accompanying drawings.

As is seen from FIG. 7, a door inner panel 10 of a vehicular door and a door trim 18 are taken as an example of the two plates. The vehicular door includes an outer panel (now shown) and the inner panel 10 which are secured to each other. The inner panel 10 has a plurality of through holes 12 for receiving fixing pins 14. Each pin 14 includes a spearhead-shaped front portion, a stem portion and a base flat portion.

A plurality of brackets 16 are used for fixing the door trim 18 to the inner panel 10. The door trim 18 comprises a base plate 20 and an outer skin layer 22. The base plate 20 has a plurality of through holes 24 for receiving rivets 26.

Each bracket 16 has a flat portion 28 which is to be placed on the inner panel 10, two opposed wall portions 30 which extend from both ends of the flat portion 28 and two flange portions 32 which outwardly extend from the ends of the opposed wall portions 30 and are to be placed on the base plate 20 of the door trim 18. The flat portion 28 of the bracket 16 has a through hole 34 to accommodate the fixing pin 14. The two flange portions 32 of the bracket 16 have respective through holes 36 for receiving the rivets 26.

Fixing the door trim 18 to the inner panel 10 is made as follows.

First, the brackets 16 are placed on the outer surface of the base plate 20 of the door trim 18 so as to mate the through holes 36 of the flange portions 32 of the bracket 16 with the through holes 24 of the base plate 20 of the door trim 18. Then, the brackets 16 are fastened to the base plate 20 of the door trim 18 by means of the rivets 26. Then, the outer skin layer 22 is bonded to the inner surface of the base plate 20. Then, the pins 14 are put into the through holes 34 of the flat portions 28 of the brackets 16. Then, the door trim 18 is brought to the inner side of the inner panel 10 having the pins 14 thrusted into the through holes 12 of the inner panel 10. Thus, the door trim 18 is tightly fixed to the inner panel 10 through the pins 14 and the brackets 16.

However, the structure for connecting two plates as mentioned hereinabove has the following drawback.

Because of usage of the rivets 26 which fix the brackets 16 to the base plate 20 of the door trim 18, the cost for the structure is inevitably increased.

SUMMARY OF THE INVENTION

Therefore, it is an object of the present invention to provide an economical structure for connecting two plates, which is simple in construction.

According to a first aspect of the present invention, there is provided a structure for connecting first and second plates, comprising: a bracket including a base disc portion, a cylindrical wall portion concentrically disposed on the base disc portion and a projection radially outwardly projected from the wall portion; first means for defining a circular opening in the first plate, the circular opening having concentrically connected smaller and larger circular portions and a notch, the notch being merged with the smaller circular portion and extending throughout the thickness of the same, the circular opening being so sized and constructed that when the bracket is fully put in the opening, the cylindrical wall portion and the base disc portion of the bracket are respectively received in the smaller and larger circular portions of the opening having the projection projected outward from the notch, so that fixing of the bracket to the first plate is achieved by fully putting the bracket in the opening and turning the same by a certain degree about its axis in the opening, and second means for connecting the bracket to the second plate.

According to a second aspect of the present invention, there is provided a vehicle door structure comprising: an inner panel; a door trim member which is to be secured to the inner panel; a bracket including a base disc portion, a cylindrical wall portion concentrically disposed on the base disc portion and a projection radially outwardly projected from the wall portion; first means for defining a circular opening in the door trim member, the circular opening having concentrically connected smaller and larger circular portions and a notch, the notch being merged with the smaller circular portion and extending throughout the thickness of the same, the circular opening being so sized and constructed that when the bracket is fully put in the opening, the cylindrical wall portion and the base disc portion of the bracket are respectively received in the smaller and larger circular portions of the opening having the projection projected outward from the notch, so that fixing of the bracket to the first plate is achieved by fully putting the bracket in the opening and turning the same by a certain degree about its axis in the opening, and second means for connecting the bracket to the inner wall.

BRIEF DESCRIPTION OF THE DRAWINGS

Other objects of the present invention will become apparent from the following description when taken in conjunction with the accompanying drawings, in which.

DETAILED DESCRIPTION OF THE INVENTION

Since the structure for connecting two plates of the present invention is similar in construction to the above-mentioned conventional connecting structure, the following description will be directed to only the parts and constructions which are different from those of the conventional connecting structure. Similar parts and constructions are denoted by the same numerals.

Referring to FIGS. 1 to 6, there is shown a structure for connecting two plates of the present invention. Like in the description of the conventional connecting structure, a door inner panel 10 of a vehicular door and a door trim 52 are taken as an example of the two plates.

Figure 1:
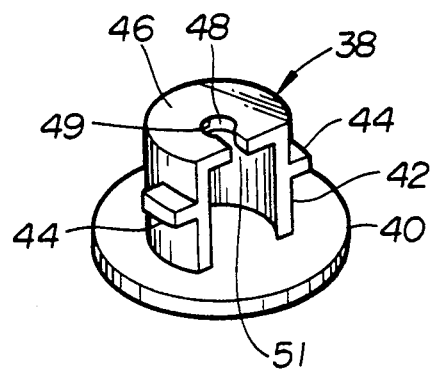
FIG. 1 is a perspective view of a bracket used in the present invention.

As is seen from FIG. 1, a bracket 38 includes a base disc portion 40, semi-cylindrical wall portion 42, a pair of rectangular projections 44, and an apertured end wall portion 46. The semi-cylindrical wall portion 42 is perpendicular to the base disc portion 40 and has a generally C-shaped cross section. The rectangular projections 44 are projected radially outwardly from diametrically opposed portions of the semi-cylindrical wall portion 42. The end wall portion 46 is parallel to the base disc portion 40 and has an opening 48 for receiving a fixing pin 14 (see FIG. 6). The opening 48 includes a circular part 49 and a passage 51 for guiding the pin 14 to the circular part 49.

Figure 2:
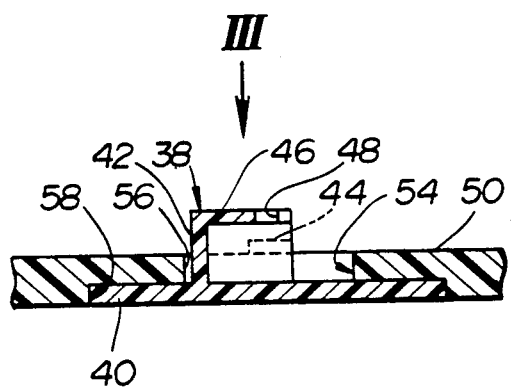
FIG. 2 is a sectional view showing a condition wherein the bracket is inserted into an opening of the base plate of a door trim.

Referring to FIGS. 2 to 6, particularly FIG. 2, a base plate 50 of the door trim 52 is made of plastic and has a plurality of openings 54 for receiving the brackets 38. Each opening 54 has concentrically connected smaller and larger circular spacer 56 and 58 and a pair of rectangular notches 60. As is seen from FIG. 3, the rectangular notches 60 are positioned at the periphery of the smaller circular space 56 and diametrically opposed to each other. The rectangular notches 60 have the same thickness as that of the smaller circular space 56. The smaller and larger circular spaces 56 and 58 and the notches 60 are so sized as to receive the semi-cylindrical wall portion 42, the base disc portion 40 and the rectangular projections 44 of the bracket 38, respectively.

Figure 4:
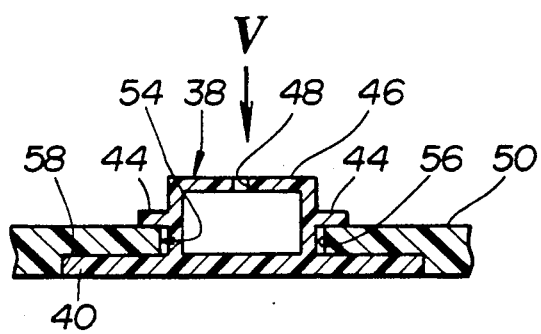
FIG. 4 is a view similar to FIG. 2, but showing a condition wherein the bracket has been axially rotated 90 degrees from the condition of FIG. 2.
Figure 6:
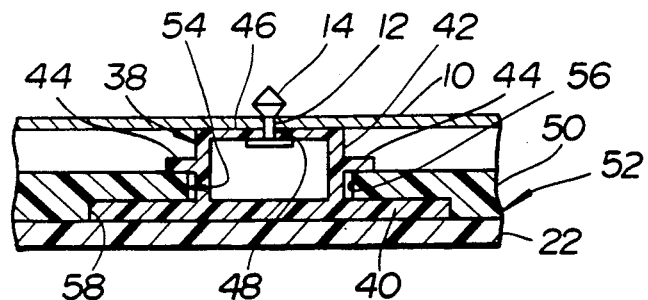
FIG. 6 is a sectional view showing a condition wherein the door trim is fixed to an inner panel through the bracket and a fixing pin.
Figure 7:
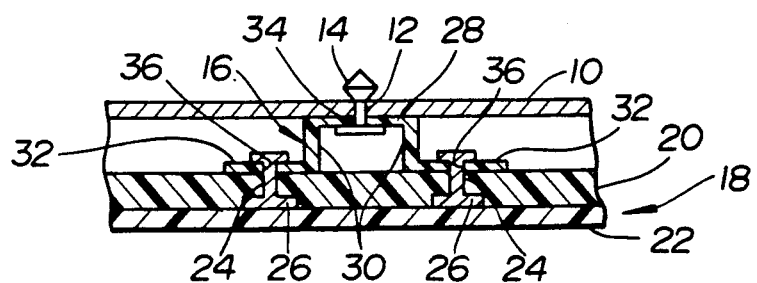
FIG. 7 is a view similar to FIG. 6, but showing a conventional structure for connecting two plates.

As is seen from FIGS. 2, 4 and 6, the thicknesses of the smaller circular space 56 and the notches 60 are the same as the distance between each rectangular projection 44 and the base disc portion 40. The thickness of the larger circular space 58 is the same as that of the base disc portion 40 of the bracket 38.

Fixing the door trim 52 to the inner panel 10 will be described in the following.

Figure 3:
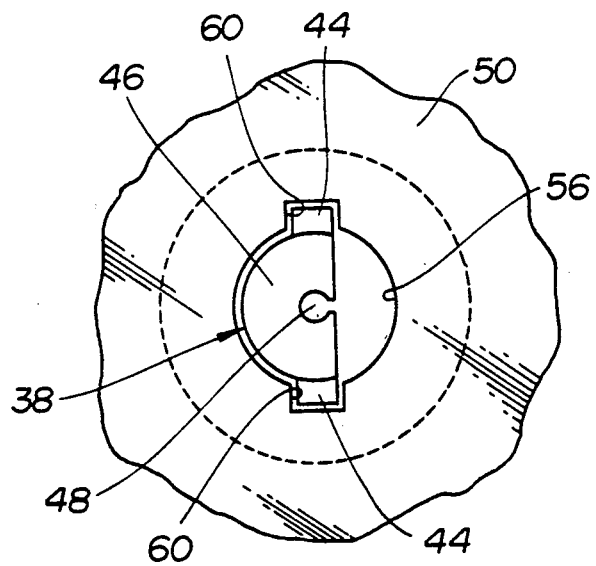
FIG. 3 is a view taken from the direction of the arrow "III" of FIG. 2.

First, as is seen from FIGS. 2 and 3, the bracket 38 is inserted into the opening 54 of the base plate 50 of the door trim 52 from the inner side of the opening 54 in such a manner that the projections 44 of the bracket 38 pass through the notches 60 of the base plate 50. This insertion is continued until the base disc portion 40 is fitted into the larger circular space 58. Under this condition, as is seen from FIG. 2, the inner surface of the base disc portion 40 of the bracket 38 becomes flush with the inner surface of the base plate 50 of the door trim 52.

Figure 5:
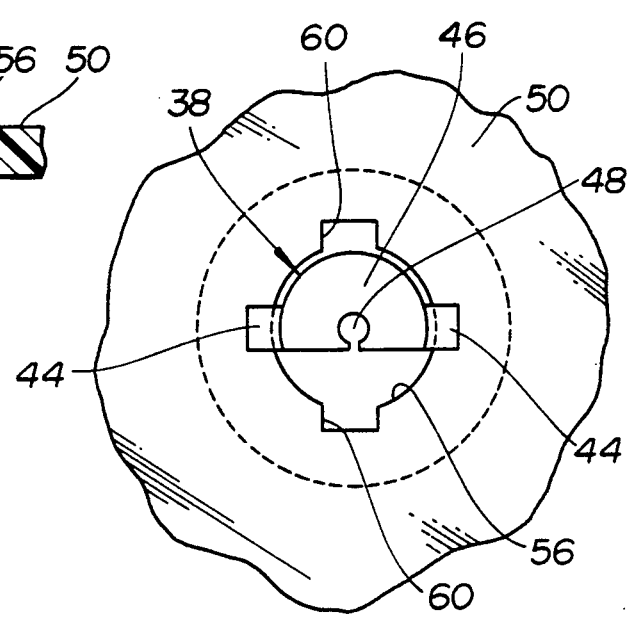
FIG. 5 is a view taken from the direction of the arrow "V" of FIG. 4.

Then, as is seen from FIGS. 4 and 5, the bracket 38 is axially rotated 90 degrees. With this, the projections 44 and the base disc portion 40 of the bracket 38 tightly hold the base plate 50 of the door trim 52 therebetween (see FIG. 4). Thus, the bracket 38 is tightly fixed to the base plate 50 of the door trim 52.

Then, as is seen from FIG. 6, the outer skin layer 22 is bonded to the inner surface of the base plate 50. Then, the fixing pin 14 is put into the circular part 49 of the opening 48 of the bracket 38, and the spearhead-shaped front portion of the pin 14 is thrusted into the through opening 12 of the inner panel 10. Thus, the door trim 52 is tightly fixed to the inner panel 10.

The advantages of the structure for connecting two plates of the present invention over the conventional one will be described in the following.

Fixing members such as rivets to fix the bracket to the base plate of the door trim are not needed. Thus, extra cost for the rivets and the rivetting process can be eliminated.

Since the fixing of the brackets to the base plate of the door trim is easily achieved by only turning the bracket in the opening of the base plate, the assembly work for the door structure is facilitated.

What is claimed is:

1. A structure for connecting first and second plates, comprising:
    a bracket including a base disc portion, a cylindrical wall portion concentrically disposed on said base disc portion and a projection radially outwardly projected from said wall portion;
    first means for defining a circular opening in said first plate, said circular opening having concentrically connected smaller and larger circular portions and a notch, said notch being merged with said smaller circular portion and extending throughout the thickness of the same, said circular opening being so sized and constructed that when said bracket is fully put in said opening, said cylindrical wall portion and said base disc portion of said bracket are respectively received in said smaller and larger circular portions of said opening having said projection projected outward from said notch, so that fixing of said bracket to said first plate is achieved by fully putting said bracket in said opening and turning the same by a certain degree about its axis in said opening, and
    second means for connecting said bracket to said second plate.

2. A structure as claimed in claim 1, in which said cylindrical wall portion of said bracket is semi-cylindrical in shape.

3. A structure as claimed in claim 2, in which the thickness of said smaller circular portion is substantially the same as the distance between said projection and said base disc portion.

4. A structure as claimed in claim 3, in which said second means comprises:
    third means for defining a through hole in said second plate;
    an apertured end wall formed on a top of the semi-cylindrical wall portion; and
    a fixing pin incorporated with both of said through hole of said second plate and said apertured end wall of said semi-cylindrical wall portion to achieve a connection therebetween.

5. A structure as claimed in claim 4, in which the aperture of said apertured end wall of said semi-cylindrical wall portion includes a circular part and a passage which are merged with each other.

6. A structure as claimed in claim 5, in which said fixing pin comprises:
    a spearhead-shaped front portion which is thrusted into said through hole of said second plate; and
    a base flat portion which abuts against an inner surface of said apertured end wall.

7. A structure as claimed in claim 6, in which said bracket is further formed with another radially outward projection, and in which said circular opening of said first plate is further formed with another notch, said another projection being operatively engaged with said another notch when said bracket is fully put in said opening.

8. A structure as claimed in claim 7, in which said another projection and the previously mentioned projection are located at diametrically opposed positions with respect to said cylindrical wall portion.

* * * * *